April 26, 1949. W. G. TAYLOR 2,468,136
FOCUSING ELECTRODE
Filed Oct. 3, 1945
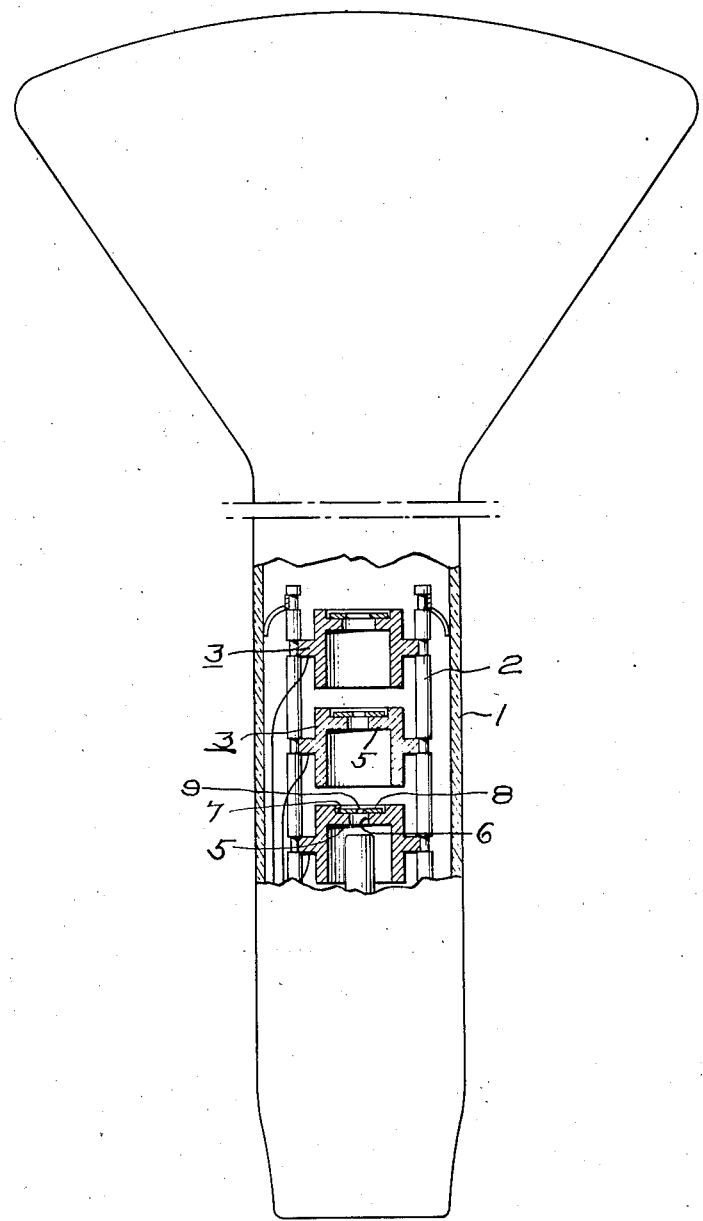
INVENTOR
Warren G. Taylor
BY
ATTORNEY Patented Apr. 26, 1949

2,468,136

UNITED STATES PATENT OFFICE 2,468,136

FOCUSING ELECTRODE

Warren G. Taylor, Essex Fells, N. J., assignor to Federal Telephone and Radio Corporation, New York, N. Y., a corporation of Delaware Application October 3, 1945, Serial No. 620,147

3 Claims. (Cl. 250—162)

The present invention relates to cathode ray tubes and particularly to structures for grids or focusing electrodes for such tubes.

In the past such cathode ray focusing electrodes have frequently been utilized which were made of graphite having a small aperture through the center thereof. While such structures were advantageous in that they would not warp under the temperature conditions prevalent in a cathode ray tube they were very difficult to manufacture in quantity since it was necessary to drill an accurate smooth hole through the graphite and this was extremely difficult to do.

In my present invention means are provided whereby a graphite support having a large central opening will be utilized and a small metal disc placed in the aperture of the graphite, the disc having an accurately ground hole therein.

It is an object of my invention to provide grid electrodes or focusing electrodes for cathode ray tubes so constructed that the structure will not warp with heat while at the same time it is provided with an accurate central aperture therethrough.

It is a further object of my invention to provide such grid electrodes which shall be simple and economical in manufacture and use.

Further objects and features of the invention will appear when the following description is considered in connection with the annexed drawing in which the single figure is a broken section of a cathode ray tube showing a number of focusing electrodes in accordance with my invention installed therein.

Referring now to the drawing there is shown at 1 the envelope of a cathode ray tube and in the broken section of this tube there is shown a structure 2 for supporting the various electron lenses or focusing electrodes positioned centrally of the cylindrical portion of the tube. Inasmuch as the electrode structures shown are identical only one will be described.

Each electrode 3 consists of a graphite member 4 which is generally cylindrical in shape and is provided near one end with a flange 5 extending inwardly and providing a central opening 6. A portion 7 of the upper surface of the flange 5 is preferably metallized in the usual manner and an annular metal ring 8 is fixed thereto, this ring being provided with an accurately ground central opening 9 forming the means for directing the electron stream. The member 8 may be fastened to the upper surface of the flange 7 by soldering or may be welded directly to the metallized graphite. If soldered the soldering may be done with either molybdenum, nickel or platinum solder.

It will be understood that the size of the central opening 6 in the flange 5 of the graphite electrode 4 is sufficient so that no accuracy in the drilling thereof is required. It will also be understood that the size of the annular metal ring 8 is sufficiently small so that no appreciable warping thereof under the temperature conditions prevalent in the tube will occur. Thus, the structure above described forms a cathode ray focusing electrode arrangement in which there will be no warping with heat while at the same time the central aperture which controls the focusing effect may be accurately formed.

It will of course be understood that the size of the central opening in the annular ring 8 is varied as is indicated in the drawing in accordance with the particular use and positioning in the tube of the electrode under consideration.

While I have described a preferred form of my invention it will be clear that modifications may be made therein without departing from the spirit of the invention and consequently I wish to be limited not by the foregoing description but solely by the appended claims.

What is claimed is:

1. A grid or focusing electrode for cathode ray tubes or the like comprising a cylindrical member of graphite, said member having an inwardly extending flange near one end thereof, a central aperture through said flange, a metallized surface on said flange adjacent said central opening, and a small metal annulus fixed to said flange, said annulus having an accurately ground central aperture therein, said aperture registering with the aperture in said flange.

2. A grid or focusing electrode for cathode ray tubes or the like comprising a cylindrical member of graphite, said member having an inwardly extending flange near one end thereof, a central aperture through said flange, a metallized surface on said flange adjacent said central opening, and a small metal annulus welded to said flange, said annulus having an accurately ground central aperture therein, said aperture registering with the aperture in said flange.

3. A grid or focusing electrode for cathode ray tubes or the like comprising a cylindrical member of graphite, said member having an inwardly extending flange near one end thereof, a central aperture through said flange, a metallized surface on said flange adjacent said central opening, and a small metal annulus soldered to said flange, said annulus having an accurately ground central aperture therein, said aperture registering with the aperture in said flange.

WARREN G. TAYLOR.

REFERENCES CITED

The following references are of record in the file of this patent:

UNITED STATES PATENTS

| Number | Name | Date |
|---|---|---|
| 1,314,603 | Mott | Sept. 2, 1919 |
| 2,154,278 | Mouromtseff | Apr. 11, 1939 |
| 2,202,588 | Kniepamp | May 28, 1940 |
| 2,359,769 | Litton | Oct. 10, 1944 |